United States Patent
Miller et al.

(10) Patent No.: US 11,613,885 B2
(45) Date of Patent: Mar. 28, 2023

(54) CONSTRUCTION USING BUNDLED TUBE AND THREADED STEPPED DOWELS

(71) Applicant: Miller Dowel Company, Wilmette, IL (US)

(72) Inventors: Michael R. Miller, Winnetka, IL (US); Robert Daly, Elk Grove Village, IL (US)

(73) Assignee: MILLER DOWEL COMPANY, Wilmette, IL (US)

(*) Notice: Subject to any disclaimer, the term of this patent is extended or adjusted under 35 U.S.C. 154(b) by 0 days.

(21) Appl. No.: 17/811,264

(22) Filed: Jul. 7, 2022

(65) Prior Publication Data
US 2022/0341153 A1 Oct. 27, 2022

Related U.S. Application Data

(62) Division of application No. 17/158,933, filed on Jan. 26, 2021.
(Continued)

(51) Int. Cl.
*E04B 1/26* (2006.01)
*E04B 1/48* (2006.01)
(Continued)

(52) U.S. Cl.
CPC ............ *E04B 1/2604* (2013.01); *E04B 1/486* (2013.01); *E04C 3/36* (2013.01); *F16B 13/02* (2013.01); *E04B 2001/2692* (2013.01)

(58) Field of Classification Search
CPC .................. E04B 1/2604; E04B 1/486; E04B 2001/2652; E04B 2001/266;
(Continued)

(56) References Cited

U.S. PATENT DOCUMENTS

| | | | | |
|---|---|---|---|---|
| 4,912,901 A * | 4/1990 | Jerry | ................... | E04F 13/0733 52/311.1 |
| 6,120,207 A * | 9/2000 | Goto | ..................... | F16B 11/006 403/268 |
| 6,871,681 B2 * | 3/2005 | Miller | ................... | F16B 11/008 144/353 |
| 2003/0136077 A1 * | 7/2003 | Gregori | ............... | E04H 17/1447 52/848 |

(Continued)

FOREIGN PATENT DOCUMENTS

| | | | | |
|---|---|---|---|---|
| FR | 2566876 A1 * | 1/1986 | ............... | B27K 3/16 |
| FR | 2673964 A1 * | 9/1992 | ............... | E04B 1/26 |

(Continued)

OTHER PUBLICATIONS

International Search Report and Written Opinion issued for International Application No. PCT/US21/15122 dated Sep. 2, 2021, 27 pages.

*Primary Examiner* — Theodore V Adamos
(74) *Attorney, Agent, or Firm* — Husch Blackwell LLP

(57) ABSTRACT

A system and method for creating a column for construction using bundled tube are provided. The column having a bottom portion, a middle portion, and a top portion. Each portion consists of a bundle of individual pillars, comprising a center pillar, a plurality of corner pillars, and a plurality of middle pillars. From the bottom portion of the column, addition pillars can be affixed on top of the pillars of the bottom portion, thus forming the middle and the top portion of the column. Each pillar can be secured to another component using a thread stepped dowel comprising of a base section, at least one middle section, and a tip section, with each section being progressively smaller in circumference than the last. The at least one middle section of the threaded stepped dowel further comprises thread spiraling around the outer surface of the at least one middle section.

16 Claims, 8 Drawing Sheets

Related U.S. Application Data

(60) Provisional application No. 63/057,399, filed on Jul. 28, 2020, provisional application No. 62/966,405, filed on Jan. 27, 2020.

(51) Int. Cl.
 *F16B 13/02* (2006.01)
 *E04C 3/36* (2006.01)

(58) Field of Classification Search
 CPC ..... E04B 2001/2664; E04B 2001/2676; E04B 2001/2648; E04B 2001/2692; E04C 3/36; F16B 13/02
 See application file for complete search history.

(56) References Cited

U.S. PATENT DOCUMENTS

| | | | |
|---|---|---|---|
| 2003/0182891 A1* | 10/2003 | Reichartz | E04B 1/34838 52/831 |
| 2008/0115699 A1* | 5/2008 | Miller | B65D 19/0095 108/56.1 |
| 2016/0222643 A1* | 8/2016 | Castelli | E04C 3/34 |
| 2021/0230857 A1 | 7/2021 | Miller et al. | |

FOREIGN PATENT DOCUMENTS

| | | | | |
|---|---|---|---|---|
| FR | 2673964 A1 | 9/1992 | | |
| WO | 9626334 A1 | 8/1996 | | |
| WO | WO-0229172 A1 * | 4/2002 | ........... | E04B 1/2604 |
| WO | WO-2006075412 A1 * | 7/2006 | .......... | B27M 3/0053 |
| WO | 2019016504 A1 | 1/2019 | | |
| WO | WO-2019074126 A1 * | 4/2019 | ............... | B27K 3/16 |

* cited by examiner

CONSTRUCTION USING BUNDLED TUBE AND THREADED STEPPED DOWELS

CROSS-REFERENCE TO RELATED APPLICATION

This application is a divisional application of U.S. application Ser. No. 17/158,933 filed Jan. 26, 2021, entitled "Construction Using Bundled Tube And Threaded Stepped Dowels" which claims the benefit of the filing date of U.S. Provisional Application Ser. No. 62/966,405 filed Jan. 27, 2020, entitled, "Improved Apparatus And Method For Assembly Of Construction Components" and U.S. Provisional Application Ser. No. 63/057,399 filed on Jul. 28, 2020, entitled "Construction Using Bundled Tube And Threaded Stepped Dowels", both of which are hereby incorporated by reference as if fully set forth herein.

BRIEF SUMMARY OF THE INVENTION

This disclosure generally relates to using bundled tube to form columns and beams for construction. The disclosure also relates to threaded stepped dowels for enhanced connection of adjoining construction components and to a method of assembling the bundled tube using the threaded stepped dowel to form a desired configuration.

BACKGROUND OF THE INVENTION

Wood has been used as a construction material for more than a thousand years. For example, Horyu-ji Temple in Japan is believed to be the oldest wooden building in the world, which was built more than 1,300 years ago.

However, for most of the twentieth century, constructions of buildings have mainly relied on utilizing reinforced concrete, such as post-tensioned concrete. In contrast, buildings built out of timber or engineered wood were relatively few and far in between. This began to change since the development of cross-laminated timber (CLT) in early 1990s.

CLT is a multilayer solid wood panel often referred to as thick wood or cross-laminated wood. Such CLT panels form solid wood panels that can be used in construction. CLT usually consists of several flat overlying flat board layers, unlike glued laminated timber (glulam) in which the layers are arranged longitudinally to the fiber.

CLT panel construction is the next level in quality and speed of construction. Wall, floor, and roof elements manufactured in a climate-controlled facility and transported to building sites for rapid assembly dramatically increases quality control in the building process.

Today, CLT is widely used in residential and light engineering structures in situations where large beam depths are required, such as long span openings in houses. However, using CLT to build skyscrapers and other megastructures remain elusive in the industry.

Several methods of construction are common. The first is known as platform construction or endoskeleton construction. Platform construction is the primary method utilized in the United States. In essence, floor joists rest on a sill plate or on top of a stud wall. The next level of wall framing will then sit on top of the fully sheathed floor joists.

Although platform construction can be utilized for smaller structures, building taller buildings out of platform construction is not ideal. Specifically, with platform construction, each additional level rests on top of the level below, meaning the weight of the higher floors is bear by the lower floors.

Unlike vertical posts and pillars, floor and ceiling panels generally consist of side-grain wood, which only has a crushing strength of around 500 pounds per square inch (psi). On the other hand, vertical pillars consist mostly of end-grain wood, which has a crushing strength of about 5,000 to 7,000 psi for most spices of wood.

Another issue with platform construction is the likelihood of compression. Mismatching floor and ceiling panels that consist mostly of side-grain wood with pillars consist mostly of end-grain wood permits a wider latitude of compression, which can be damaging for a structure.

In contrast, a second method is known as balloon construction or exoskeleton construction. Although once prevalent in the United States, this construction method is now more popular in Europe. Unlike a platform construction, the wall stud rests on the sill plate with a rim joist in the interior side and then the floor joist. The stud wall is continuous from the sill plate to the top plate. At the second level the floor connection, joists rest on a ledger and are then face nailed to the studs. Thus, there is a need to create a continuous column or stud tall enough for the construction of a superstructure.

An issue with building a skyscraper out of wood is the need of large support columns that are also made of wood. Creating a column that can withstand the weight of a tall building is engineeringly challenging. Thus, there is a need for a column, made of wood, that can be used in constructing larger wooden buildings.

Likewise, joining wood construction components remain a constant challenge in the industry. Traditionally, metal fasteners such as screws, nails, or rods have been used to join together adjoining wooden components. However, the materialistic property of metal is fundamentally different from that of wood. The problem is further amplified when attempting to join together large pieces of construction components, such as walls, roofs, beams, and columns. Thus, there is a need in for a mechanism to join wooden construction materials using a wooden fastener.

Figure 1:
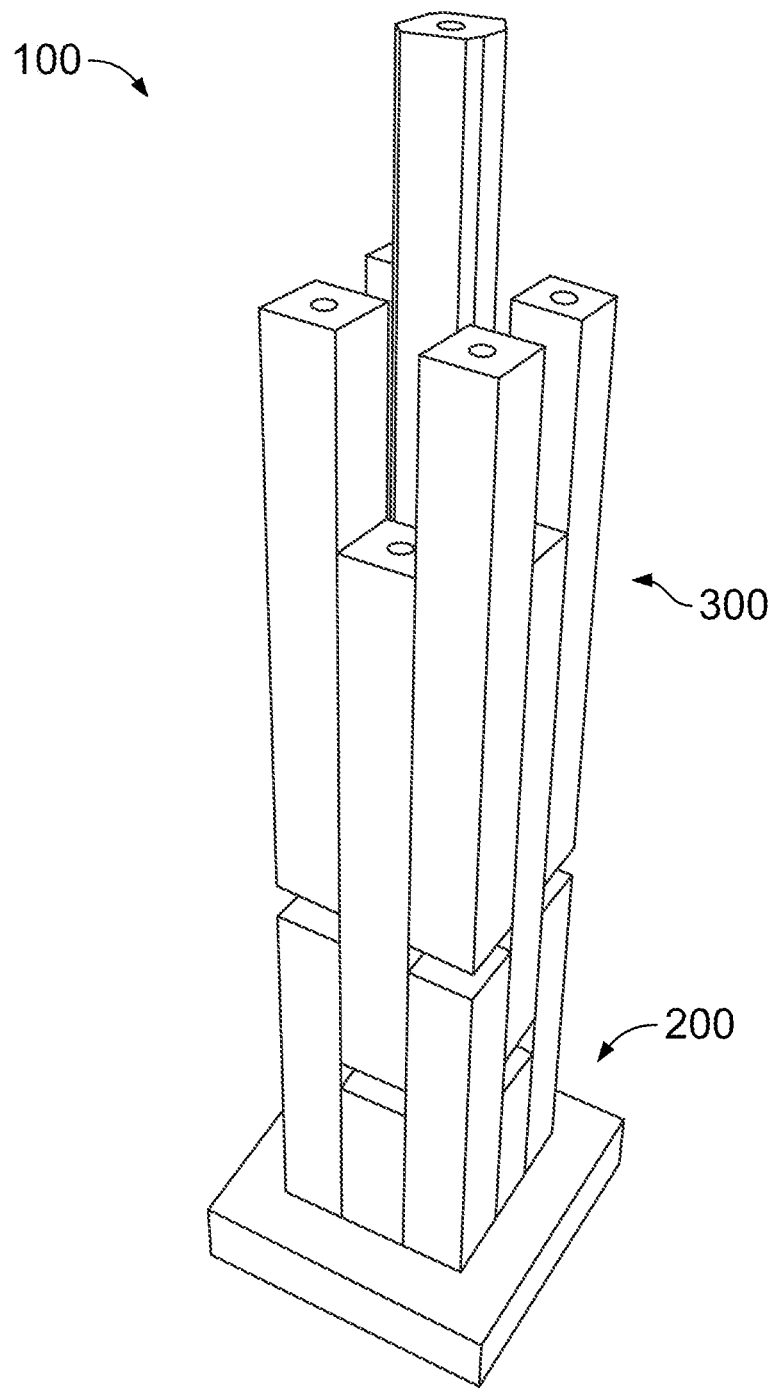
FIG. 1 illustrates a perspective view of a bundled tube according to an exemplary embodiment.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

As shown in FIGS. 1-9, the embodiments of this disclosure include a threaded stepped dowel, and a column formed from a bundled tube.

In order to construct taller buildings and larger structures using engineered wood such as CLT, especially in circumstances where balloon construction is preferred, a new way to form a larger column or stud is necessary. This is due in part to the difficulty of transporting one massive pre-constructed column from a prefabrication plant, but also the difficulty of creating a column large enough to support a superstructure off-site.

FIG. 1 shows a novel way to construct a column using bundled tube. Instead of having one massive column made from wood, the column 100 is created by combining a plurality of smaller pillars of different lengths together to form the larger column 100. Depending on the need of the specific building, the column 100 can range from several feet tall to hundreds of feet tall. That is to say, using the principle disclosed herein, the length of the column 100 can vary to suit its purpose. A column 100 can include a base portion 200, a middle portion 300, and a top portion 400.

Figure 2:
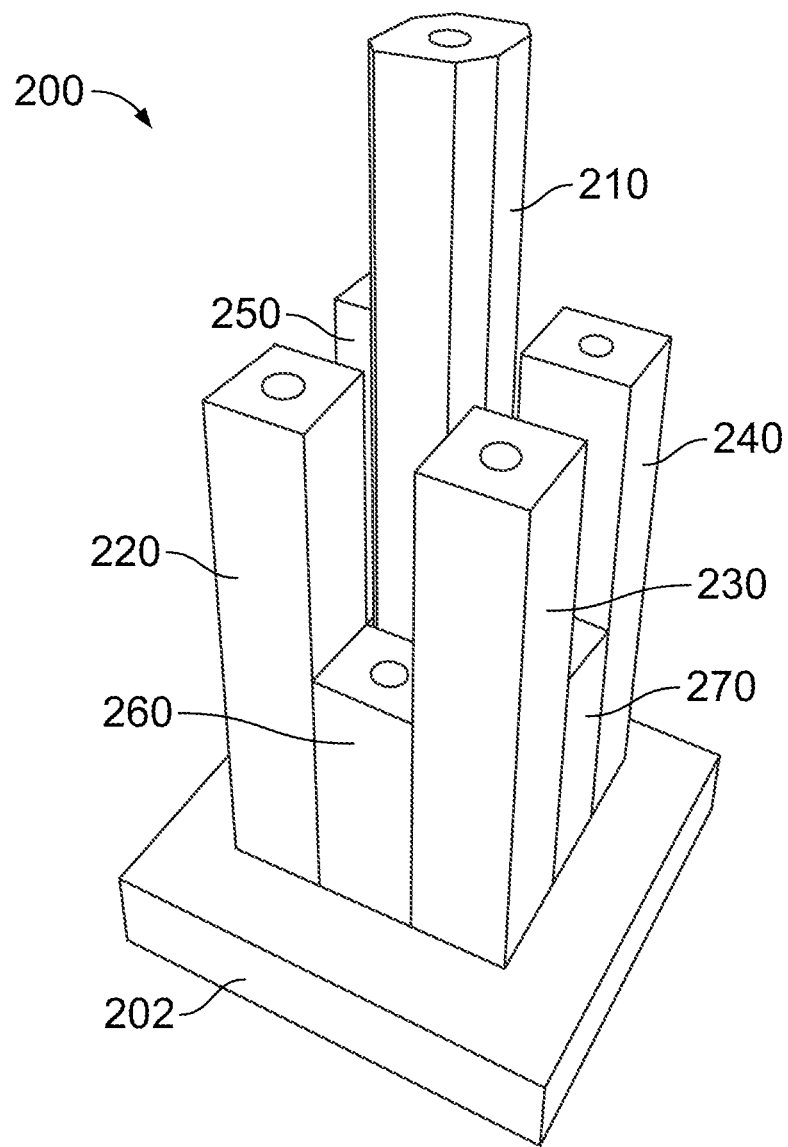
FIG. 2 illustrates another perspective view of the bundled tube according to the exemplary embodiment.
Figure 3:
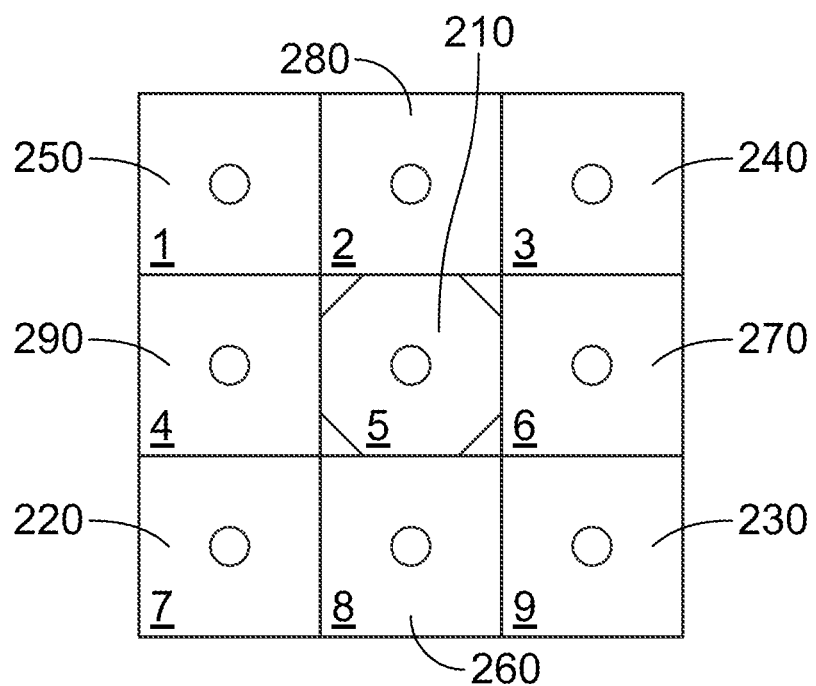
FIG. 3 illustrates a top view of the bundled tube according to the exemplary embodiment.

Referring to FIGS. 2 and 3, the base portion 200 of the column 100 is formed by at least nine individual pillars in a three by three layout. A sill plate or a base 202 is provided at the bottom most portion of a building. From there, nine pillars are utilized to build the base portion 200.

First, a center pillar 210 is affixed onto the base 202 in the center of a three-by-three grid. I.e., position 5 as shown in FIG. 3. The center pillar 210 is an elongated pillar with a top surface and a bottom surface. In an embodiment, the center pillar 210 can be made out of engineered wood such as CLT. In another embodiment, the center pillar 210 can be made out of natural timber.

A first bore is provided at a center portion of the bottom surface of the center pillar 210, and a second bore is provided at a center portion of the top surface of the center pillar 210. The first bore and the second bore are used to receive fasteners so that the center pillar 210 can be affixed on top of the base 202, and that another center pillar can be affixed on top of the center pillar 210.

In an embodiment, the first bore and the second bore can be separate and distinct, i.e., they do not bore through the entire center pillar 210. In another embodiment, the first bore and the second bore can connect, thus forming one continuous bore through the center pillar 210. The internal shapes of the first bore and the second bore varies depending on the type of fastener being used. That is to say, the first bore and the second bore need be the same shape.

The center pillar 210 can be affixed to the base 202 through a variety of means. In an embodiment, the center pillar 210 is affixed to the base 202 through a stepped dowel such as the ones disclosed in U.S. Pat. No. 6,871,681, which is incorporated by reference in its entirety herein. In another embodiment, the center pillar 210 can be twisted onto the base 202 by using a threaded stepped dowel that will be described in more detailed later. Other fasteners can also be used, such as metal studs or rods known in the art.

The fastener is affixed onto the base 202 through any appropriate mean. Thereafter, the fastener, which is protruding out of the base 202, is received in the first bore of the center pillar 210, which is located at the bottom surface of the center pillar 210.

In an embodiment, as seen in FIGS. 2 and 3, the center pillar 210, when viewed from top down, is octagonal in shape to provide space for corner pillars 220, 230, 240, 250, to be twisted into place. In another embodiment, the center pillar 210 can be cylindrical. In yet another embodiment where the corner pillars 220, 230, 240, 250, need not be twisted into place, such as in cases where the corner pillars 220, 230, 240, 250, are dropped in place instead, the center pillar 210 can be rectangular in shape. Other shapes can also be possible depending on the specific circumstances.

Once the center pillar 210 is affixed onto the base 202, the corner pillars 220, 230, 240, 250 are then affixed onto the base 202. Similar to the center pillar 210, the corner pillars 220, 230, 240, 250 are elongated pillars with respective top surfaces and bottom surfaces. The corner pillars 220, 230, 240, 250, are generally rectangular in shape when viewed top down. In an embodiment, the corner pillars 220, 230, 240, 250 are shorter than the center pillar 210 as shown in FIG. 2. In another embodiment, the corner pillars 220, 230, 240, 250 can be longer than the center pillar 210. In yet another embodiment, the corner pillars 220, 230, 240, 250 can be the same length as the center pillar 210. It is preferred that the corner pillars 220, 230, 240, 250 have the same length as one another, but each individual corner pillar can have different lengths if necessary.

Similar to the center pillar 210, each of the corner pillars 220, 230, 240, 250 has a first bore on its respective bottom surface, and a second bore on its respective top surface, each extending inward from their respective surfaces. These bores are used to affix the corner pillars 220, 230, 240, 250 to the base 202 from the bottom, and to affix additional corner pillars on top of the corner pillars 220, 230, 240, 250.

In an embodiment, threaded stepped dowels can be used to affix the corner pillars 220, 230, 240, 250 to the base 202 to, referring to FIG. 3, positions 7, 9, 3, and 1 respectively. When threaded stepped dowels are used, the corner pillars 220, 230, 240, 250 can be twisted onto the base 202 during installation, thus affixing the corner pillars 220, 230, 240, 250 onto the base 202. To accommodate for the twisting motion during installation, it is preferred that the center pillar 210 is octagonal as described above, although the center pillar 210 can also be cylindrical or other appropriate shapes.

In another embodiment, the corner pillars 220, 230, 240, 250 can be dropped onto fasteners protruding out of the base 202 instead of being twisted onto the base 202. In this embodiment, un-threaded stepped dowels can be used, as well as other types of conventional fasteners known in the art.

Once the corner pillars 220, 230, 240, 250 are affixed onto the base 202 in addition to the center pillar 210, middle pillars 260, 270, 280, 290 are then affixed onto the base 202. As with other pillars, the middle pillars 260, 270, 280, 290 are elongated pillars each having a top surface and a bottom surface. The middle pillars 260, 270, 280, 290 are generally rectangular in shape, although other shapes can be possible.

Again, each of the middle pillars 260, 270, 280, 290 has a first bore on its respective bottom surface, and a second bore on its respective top surface, each extending inward from their respective surfaces. These bores are used to affix the middle pillars 260, 270, 280, 290 to the base 202 from the bottom, and to affix additional middle pillars on top of the middle pillars 260, 270, 280, 290.

In an embodiment, the middle pillars 260, 270, 280, 290 are shorter than the center pillar 210 and also short than the corner pillars 220, 230, 240, 250 as shown in FIG. 2. In another embodiment, the middle pillars 260, 270, 280, 290 can be longer than the center pillar 210 or the corner pillars 220, 230, 240, 250 or both. In yet another embodiment, the middle pillars 260, 270, 280, 290 can be the same length as the center pillar 210 or the corner pillars 220, 230, 240, 250 or both. It is preferred that the middle pillars 260, 270, 280, 290 have the same length as one another, but each individual middle pillar can have different lengths if necessary.

During installation, the middle pillars 260, 270, 280, 290 are dropped onto fasteners protruding out of the base 202 at, referring to FIG. 3, positions 8, 6, 2, and 4 respectively. According to an embodiment, the center pillar 210 can be affixed onto the base 210 first, follow by the corner pillars 220, 230, 240, 250, follow by the middle pillars 260, 270, 280, 290. Thus completing the construction of the bottom portion 200. Because the middle pillars 260, 270, 280, 290 are installed last, they act to lock the remaining pillars in place. That is to say, once the middle pillars 260, 270, 280, 290 are successfully installed, all nine pillars are fixed in place and can no longer be removed.

In an embodiment, a first length of the center pillar 210 is different from a second length of the corner pillars 220, 230, 240, 250, which is also different from a third length of the middle pillars 260, 270, 280, 290. Thus, when viewed from the side, as shown in FIG. 2, the pillars are staggered in different heights. The bundled tube configuration allows the resulting column 100 to have a higher structural integrity. In another embodiment, the lengths of all three types of pillars can be the same. In yet another embodiment, the length of two of the types of pillars can be the same, but different from the third type of pillar. For example, the center pillar 210 can be the same length as the corner pillars 220, 230, 240, 250, but a different length as to the middle pillars 260, 270, 280, and 290.

Figure 4:
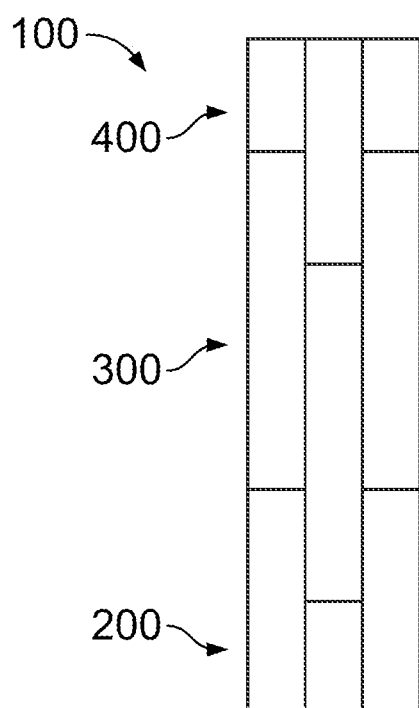
FIG. 4 illustrates a side view of the bundled tube according to the exemplary embodiment.
Figure 5A:
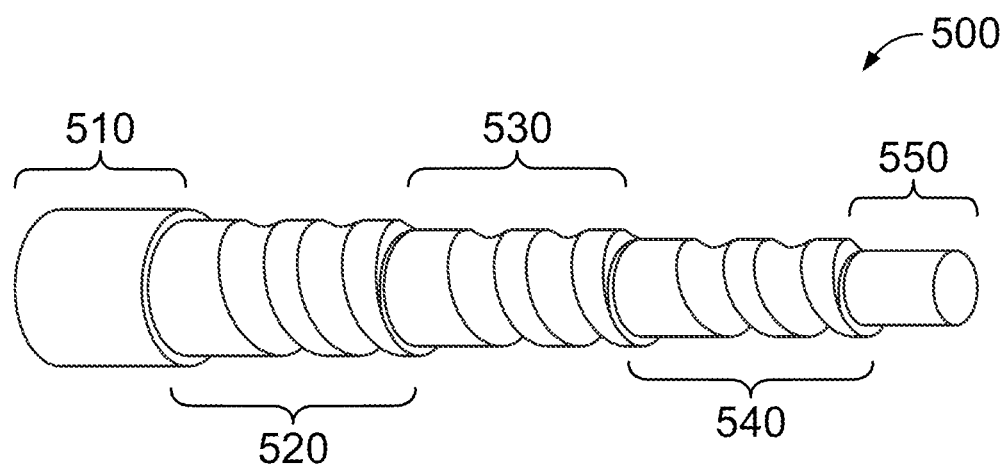
FIGS. 5A and 5B illustrate perspective views of a threaded stepped dowel according to an exemplary embodiment.
Figure 5B:
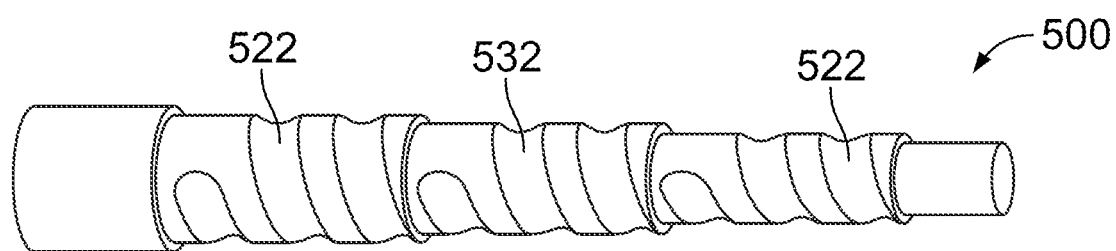

Referring to FIGS. 1 and 4, once the bottom portion 200 is constructed, addition pillars can be affixed on top of the pillars of the bottom portion 200, forming the middle portion 300 of the column 100.

The installation of the middle portion 300 is similar to the bottom portion 200. That is, a center pillar of the middle portion 300 is affixed onto the center pillar 210 of the bottom portion 200 first. Follow by corner pillars of the middle portion 300 onto the corner pillars 220, 230, 240, 250 of the bottom portion 200 respectively. Lastly, middle pillars of the middle portion 300 are then dropped onto the middle pillars 260, 270, 280, 290 of the bottom portion 200 respectively.

Unlike the pillars of the bottom portion 200 however, in an embodiment, all the pillars of the middle portion 300 can have a same length. Thus, reducing manufacturing complexity and cost. However, the pillars of the middle portion 300 can have varying lengths when appropriate.

In an embodiment, the corner pillars of the middle portion 300 are twisted onto the corner pillars 220, 230, 240, 250 of the bottom portion 200 through the use of threaded stepped dowels that will be described in more detail later. The center pillar of the middle portion 300 can be twisted onto the center pillar of the bottom portion 200 through the use of a threaded stepped dowel, or it can be dropped onto a convention dowel or fastener protruding out of the center pillar 210 of the bottom portion 200. Likewise, the middle pillars of the middle portion 300 are dropped onto dowels or fastener protruding out of the middle pillars 260, 270, 280, 290 of the bottom portion 200.

To facilitate the embodiments where additional corner pillars are twisted onto corner pillars below, the corresponding center pillar can be octagonal in shape. Alternatively, the corresponding center pillar can be cylindrical. However, in the embodiments where additional corner pillars are dropped onto corner pillars below, the corresponding center pillar can be rectangular in shape, as no extra room is needed to allow for the twisting motion.

Because the pillars of the bottom portion 200 are staggered in heights, by placing addition pillars of the same length on top of the pillars of the bottom portion 200 would also result in staggered heights in the middle portion 300 as shown in FIG. 4. Again, the staggered configuration provides the resulting column 100 with better structural integrity, although non-staggered configuration can also be used to save cost of manufacturing.

Although FIGS. 1 and 4 show only one additional pillar on top of each of the pillars of the bottom portion 200, additional pillars can be stacked on top to form an even longer middle portion 300. That is to say, middle portion 300 can be as tall as necessary by affixing additional center pillars, corner pillars, and middle pillars on top of the pillars below. This is especially useful in a balloon construction where a column extends continuously from a sill plate to a top plate.

Once the middle portion 300 is at a desired height, the top portion 400 can then cap off the middle portion 300, thus completing the construction of the column 100. The top portion 400 can cap off the middle portion 300 in a variety of ways. For example, the top portion 400 can simply be a reverse of the bottom portion 200 comprising a center pillar, a plurality of corner pillars, and a plurality of middle pillars, where each pillar is affixed to the respective pillar of the middle portion 300 below.

Using FIG. 2 as an example, using corner pillars 220, 230, 240, and 250 of the bottom portion 200 as reference points, if the center pillar 210 of the bottom portion 200 is longer than the corner pillars of the bottom portion 200, then the center pillar of the top portion 400 can be the shorter than corner pillars of the top portion 400 to compensate for the length of the center pillar of the bottom portion. Likewise, if the middle pillars of the bottom portion are shorter than the corner pillars of the bottom portion, then the middle pillars of the top portion 400 can be longer to compensate for the length difference, so that the constructed column has a flat top surface that can be affixed to other structural elements. However, it is to be understood that the top surface of a column needs not be flat and column lengths of the top portion 400 can vary depending on the specific construction need.

Once each portion of the column 100 is construction, each individual pillar can further be reinforced from the sides through lateral fasteners such as additional dowels, nails, screws, or the like. Lateral reinforcement can also be metal rods or collars around the circumference of the column 100.

In an embodiment, individual pillars can further be fastened to one another through a side fastener. For example, referring to FIG. 3, the corner pillar 220 can be fastened to the middle pillar 260 laterally through a dowel, a stepped dowel, a threaded stepped dowel, or other fasteners such as nails, toenails, screws, or the like. In this embodiment, the corner pillar 220 can be fastened to the middle pillar 260, the corner pillar 230 can be fastened to the middle pillar 270, the corner pillar 240 can be fastened to the middle pillar 280, and the corner pillar 250 can be fastened to the middle pillar 290. In addition, the middle pillars 260, 270, 280, 290 can also be laterally fastened to the center pillar 210 through appropriate means such as dowels. When dowels are used to fasten adjoining pillars together laterally, each pillar can be predrilled for the dowels to permit for easy installation on-site.

Next, a threaded stepped dowel is described in more details herein. Referring to FIGS. 5A-6B, a threaded stepped dowel 500 according to an embodiment can be made of multiple sections, a base section 510 having the largest circumference or perimeter and each successive middle sections 520, 530, 540 having a smaller circumference or perimeter than the preceding section follow by a tip section 550. When viewed in profile, such a dowel has a shape that is stepped or terraced, where the base section 510 is wider or larger than its opposed tip section 550.

Although the figures illustrate three middle sections, the threaded stepped dowel 500 can comprise less or more middle sections. That is to say, the amount of middle section can range from one to as many as necessary. The threaded stepped dowel 500 can be made out of timber or engineered wood. Preferably, the threaded stepped dowel 500 is made out of the same material as the individual pillars of the bundled tube. The threaded stepped dowel 500 as described herein is suitable to be used to fasten components made of timber or engineered wood such as CLT or glulam. Certainly, the threaded stepped dowel 500 can also be used to fasten components not made of wood. In an embodiment, the threaded stepped dowel 500 can be one-way threaded. In yet another embodiment, the threaded stepped dowel 500 can be two-way threaded.

Figure 6A:
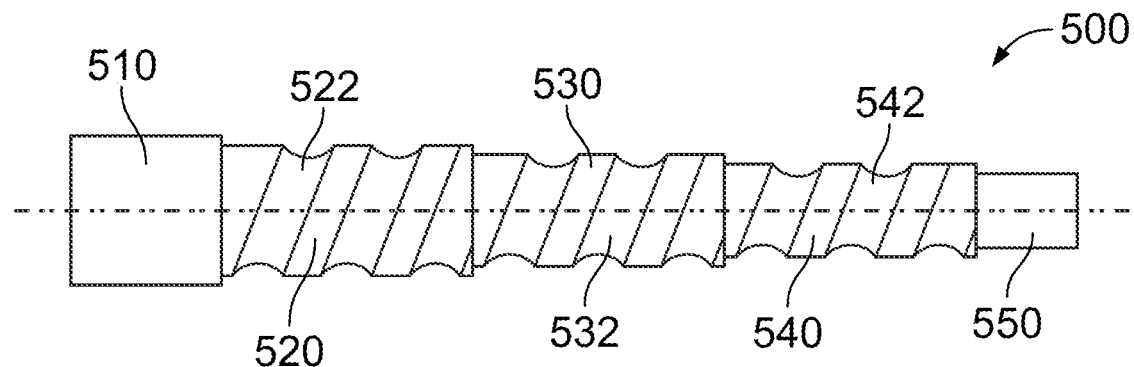
FIG. 6A illustrates a side view of the threaded stepped dowel according to the exemplary embodiment.

According to an embodiment, as shown in FIG. 6A, the sections 510, 520, 530, 540, 550 are generally cylindrical in shape with decreasing circumferences from one section to another. Each of the middle sections 520, 530, 540 further comprises grooves or threads 522, 532, 542 along the surface of these sections. The threads 522, 532, 542 spiral around each of their respective sections, forming a continuous thread in each section.

Figure 6B:
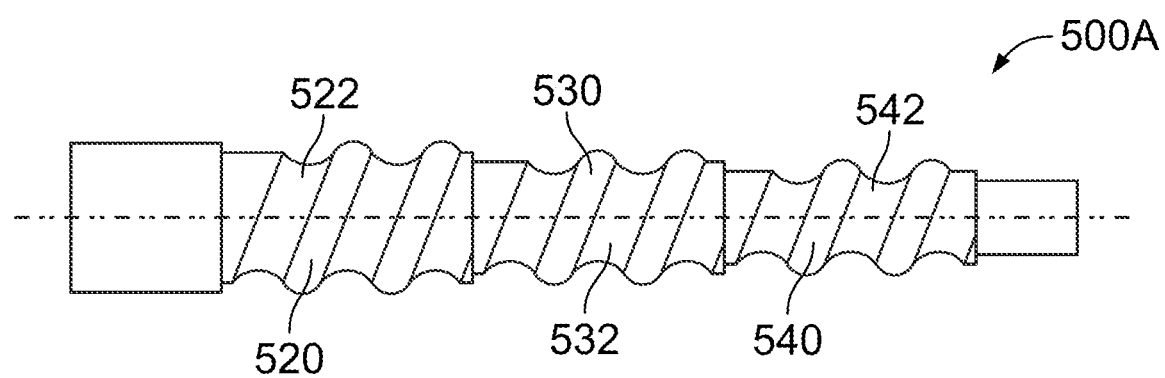
FIG. 6B illustrates a side view of a threaded stepped dowel according to another exemplary embodiment.

According to another embodiment, as shown in FIG. 6B, the middle sections 520, 530, 540 together with threads 522, 532, 542 form a generally sinusoidal profile. That is to say, when viewed from the side, each groove or thread curves inward toward a center axis of the threaded stepped dowels 500A, whereas the sections between each thread curves outward away from the center axis of the threaded stepped dowels 500A. The difference between the designs in FIG. 6A and FIG. 6B being that the additional curvatures as shown in the embodiment in FIG. 6B allows more exposures of end-grain wood, thus allowing the threaded stepped dowel 500A to absorb more moisture, whereas the flat profile of the threaded stepped dowel 500 as shown in FIG. 6A exposes more side-grain wood that absorbs less moisture. Nonetheless, both designs are suitable for use for the purpose of constructing the bundled tube as previously discussed.

In an embodiment, the threads 522, 532, 542 form a single-start threadform with respect to the corresponding middle sections 520, 530, 540. Single-start refers to the configuration that each time the corresponding middle section is rotated by 360°, the middle section advanced axially by one ridge. However, when the threaded stepped dowel 500 comprises multiple middle sections, with each middle section having its own thread, the threaded stepped dowel 500 as a whole can be multi-start. For example, when the threaded stepped dowel 500 comprises three middle sections 520, 530, 540, and each middle section having a corresponding thread 522, 532, 542, although each middle section 520, 530, 540 is a single-start, the threaded stepped dowel 500 as a whole is a triple-start. That is to say, when the threaded stepped dowel 500 is rotated by one full rotation (360° degree), the threaded stepped dowel 500 advances by three ridges (one for each middle section). As it is to be appreciated, the stepped design of the threaded stepped dowel 500 increases the combined thread strength per rotation, i.e., being engaged to multiple additional ridges per rotation, instead of being engaged to one additional ridge per rotation.

Figure 7:
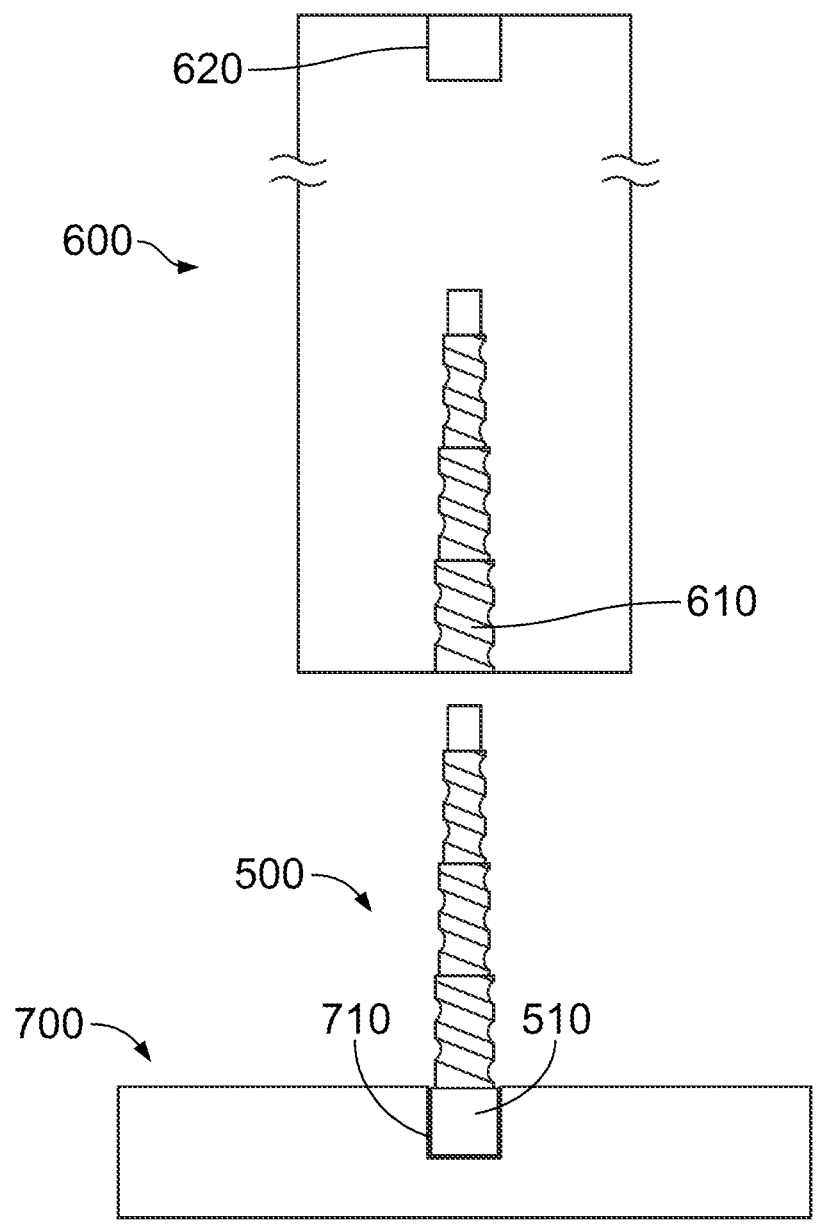
FIG. 7 illustrates a cross sectional view of a first component to be affixed onto a second component using a threaded stepped dowel according to an exemplary embodiment.

Referring to FIG. 7, unlike a traditional dowel, the threaded stepped dowel 500 enables a first component 600 to be twisted onto a second component 700, creating a more secured connection between the two components. Unlike a traditional dowel where the two components can be pulled apart through opposing forces, components fastened by the threaded stepped dowel 500 can only be disengaged by a reverse twisting motion, making the fastened components more difficult to disengage from one another.

In practice, the base section 510 of the threaded stepped dowel 500 is affixed onto the second component 700. For example, the second component 700 can comprise a bore 710 on its top surface that corresponds to the size of the base section 510 so that the base section 510 can be inserted into or onto the second component 700. Glue or other adhesives can also be applied to further secure the base section 510 within the bore 710 of the second component 700.

On the flip side, the first component 600 can comprise a bore 610 at its bottom surface that mirrors the shape of the threaded stepped dowel 500. That is to say, the bore 610 defines a cavity having generally the same shape as the profile of the threaded stepped dowel 500, allowing the first component 600 to be able to twist onto the threaded stepped dowel 500.

As illustrated in FIG. 7, the first component 600 can be one of the pillars of the column 100 as described before, and the second component 700 can be the base 202 as previously described. However, the same mechanism can also be used to connect one pillar with another. For example, the first component 600 can further comprise a bore 620 on its top surface that can be used to engage with another threaded stepped dowel, which then engages with another pillar on top.

Figure 8A:
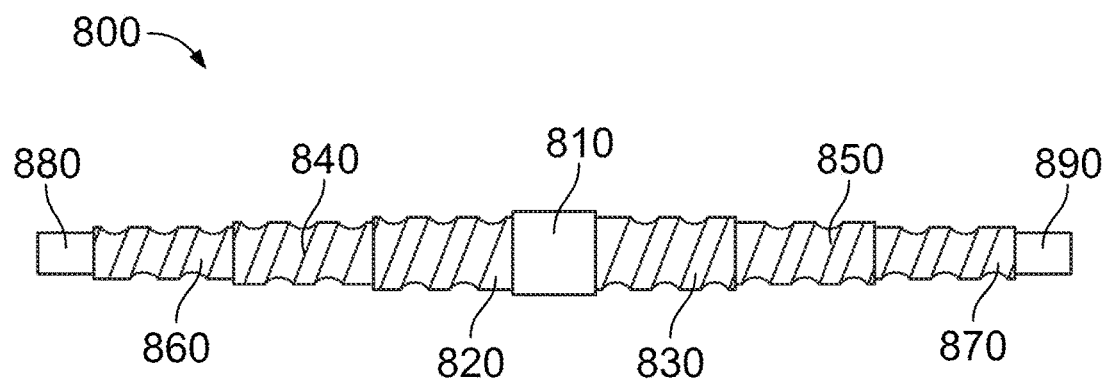
FIGS. 8A and 8B illustrate side views of alternative designs of a threaded stepped dowel according to another exemplary embodiments.

Referring to FIG. 8A, an alternative design of the threaded stepped dowel 500 as discussed prior can be a double-sided threaded stepped dowel 800. Mechanically, this alternative design is largely similar to the threaded stepped dowel 500.

Figure 8B:

In this embodiment, a base section 810 is located toward the center of the double-sided threaded stepped dowel 800 with middle sections extending outward therefrom. Similar to the threaded stepped dowel 500, each successive section of the double-sided threaded stepped dowel 800 decreases in circumference with the tip sections 880, 890 having the smallest circumferences of all the sections. Likewise, each middle sections 820, 830, 840, 850, 860, 870 is provided with thread or groove that spirals around the outer surface of each section. Similar to a threaded stepped dowel 500, the double-sided threaded stepped dowel 800 can have any number of middle sections. Moreover, the number of the middle sections on one side of the double-sided threaded stepped dowel 800 need not be the same as the number of the middle sections on the other side. In yet another embodiment, the base section 810 can be omitted altogether, as shown in FIG. 8B.

Figure 9:
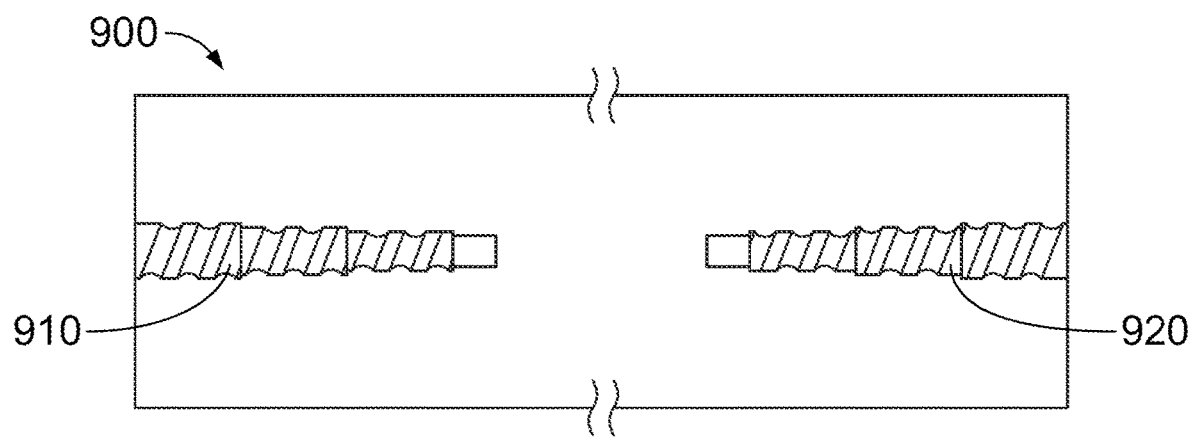
FIG. 9 illustrates a cross sectional view of a pillar according to another embodiment.

FIG. 9 shows another embodiment of one of the pillars to be used for the bundled tube in forming column 100. In this embodiment, a pillar 900 can contain bores 910, 920 on the top and bottom surfaces of the pillar 900. The bores 910, 920 each defining a cavity to each accept a threaded stepped dowel. The pillar 900 can be used as one of the corner pillars as discussed previously especially in the middle portion 300 of the column 100. Alternatively, the pillar 900 can be octagonal or cylindrical in shape, which then can be used as one of the center pillars.

Figure 10:
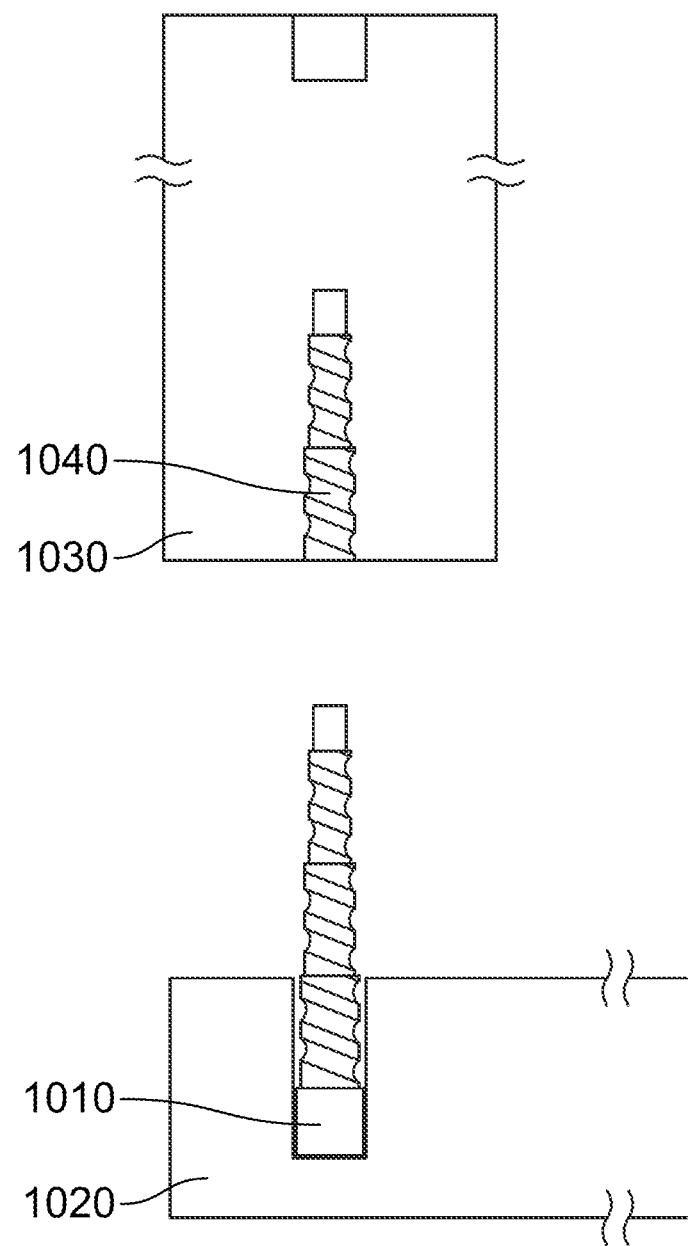
FIG. 10 illustrates a cross sectional view of attaching two components with a threaded stepped dowel according to an embodiment.

FIG. 10 illustrates an example of how a threaded stepped dowel can be used when platform construction is desired. A base section of a threaded stepped dowel 1010 can be installed onto a first component 1020. The first component 1020 can be various panels typically found in construction of a building, such as a floor panel, a ceiling panel, or a wall panel. In an embodiment, only the base section of the threaded stepped dowel 1010 is contained within the first component 1020. In another embodiment, the base section, together with one or more middle sections of the threaded stepped dowel 1010 can be contained within the first component 1020. For example, in FIG. 10, the base section, together with one middle section is contained within the first component 1020. Thus, it is understood that so long as enough middle section(s) of the threaded step dowel 1010 remain available to mate with a second component, the exact configuration can be adjusted as necessary.

As before, a second component 1030 can be affixed onto the first component 1020 by twisting the second component 1030 onto the threaded stepped dowel 1010. Specifically, the second component 1030 can comprise a corresponding bore 1040 that mates with the threaded stepped dowel 1010. The second component 1030 can be a column, a beam, a pillar, or a post. It is to be appreciated that the threaded stepped dowel 1010 can also be installed on the second component 1030 instead of or in addition to the first component 1020. By way of example, a threaded stepped dowel can be installed on a beam or column, and a panel can be affixed onto the beam therefrom.

Certainly, in a platform construction, more than one pillars can be affixed onto a panel. In a typical construction, about 25 pillars can be used per floor. These 25 pillars can all be affixed to the floor panel using threaded stepped dowels. Illustratively, assuming a threaded stepped dowel is 4.5 inches in diameter. Said threaded stepped dowel would be able to withstand a crushing weight of about 80,000 pounds ($2.25^2 * \pi * 5{,}000 \approx 80{,}000$). Thus, when 25 of these threaded stepped dowels are used, the crushing weight that these threaded stepped dowels can withstand is about 2 million pounds, well enough for a typical building.

Specific embodiments of a column formed by bundled tube and a threaded stepped dowel according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A column apparatus comprising:
    a bottom portion and a middle portion each including a center pillar, a plurality of corner pillars, and a plurality of middle pillars;
    the center pillar of the bottom portion being attached to the center pillar of the middle portion;
    the plurality of corner pillars of the bottom portion being attached to the plurality of corner pillars of the middle portion respectively; and
    the plurality of middle pillars of the bottom portion being attached to the plurality of middle pillars of the middle portion respectively,
    wherein each of the plurality of corner pillars of the middle portion is attached onto each of the plurality of corner pillars of the bottom portion respectively by a first threaded stepped dowel.

2. The column apparatus of claim 1 further comprising:
    a top portion including a center pillar, a plurality of corner pillars, and a plurality of middle pillars;
    the center pillar of the middle portion being further attached to the center pillar of the top portion;
    the plurality of corner pillars of the middle portion being further attached to the plurality of corner pillars of the top portion respectively; and
    the plurality of middle pillars of the middle portion being further attached to the plurality of middle pillars of the top portion respectively.

3. The column apparatus of claim 2, wherein each of the center pillar, the plurality of corner pillars, and the plurality of middle pillars of each of the bottom portion, the middle portion, and the top portion are made of wood.

4. The column apparatus of claim 1:
    the bottom portion further comprises a base, to which the center pillar, the plurality of corner pillars, and the plurality of middle pillars of the bottom portion are affixed onto.

5. The column apparatus of claim 4, wherein the base is configured to receive a first section of a plurality of second threaded stepped dowel;
    wherein the plurality of corner pillars of the bottom portions each comprises a bore on a respective bottom surface for receiving a second section of the plurality of second threaded stepped dowel.

6. The column apparatus of claim 4:
    the center pillar of the bottom portion having a first length, the plurality of corner pillars of the bottom portion having a second length, and the plurality of middle pillars of the bottom portion having a third length,
    wherein the first length, the second length, and the third length are different lengths from one another.

7. The column apparatus of claim 4, wherein the center pillar of the bottom portion is longer than the plurality of corner pillars of the bottom portion, which are longer than the plurality of the middle pillars of the bottom portion.

8. The column apparatus of claim 4, wherein the center pillar of the middle portion, the plurality of corner pillars of the middle portion, and the plurality of middle pillars of the middle portion have a same length.

9. The column apparatus of claim 1:
the plurality of corner pillars of the bottom portion each comprises a first bore for receiving a first section of the first threaded stepped dowel on a respective top surface; and
the plurality of corner pillars of the middle portion each comprises a second bore for receiving a second section of the first threaded stepped dowel on a respective bottom surface.

10. The column apparatus of claim 1, wherein the first threaded stepped dowels are made of the same material as the plurality of corner pillars of the bottom portion and the plurality of corner pillars of the middle portion.

11. A method of constructing a column comprising:
forming a bottom portion by:
providing a base;
affixing a center pillar of the bottom portion onto the base;
affixing a first corner pillar, a second corner pillar, a third corner pillar, and a fourth corner pillar of the bottom portion onto the base;
affixing a first middle pillar, a second middle pillar, a third middle pillar, and a fourth middle pillar of the bottom portion onto the base;
forming a middle portion by:
affixing a center pillar of the middle portion on top of the center pillar of the bottom portion;
affixing a first corner pillar, a second corner pillar, a third corner pillar, and a fourth corner pillar of the middle portion on top of the respective corner pillars of the bottom portion;
affixing a first middle pillar, a second middle pillar, a third middle pillar, and a fourth middle pillar of the middle portion on top of the respective middle pillars of the bottom portion;
forming a top portion by:
affixing a center pillar of the top portion on top of the center pillar of the middle portion;
affixing a first corner pillar, a second corner pillar, a third corner pillar, and a fourth corner pillar of the top portion on top of the respective corner pillars of the middle portion; and
affixing a first middle pillar, a second middle pillar, a third middle pillar, and a fourth middle pillar of the top portion on top of the respective middle pillars of the middle portion,
wherein the corner pillars of each of the bottom portion, the middle portion, and the top portion are affixed together by using a plurality of first threaded stepped dowels.

12. The method of claim 11, wherein the first corner pillar, the second corner pillar, the third corner pillar, and the fourth corner pillar of the bottom portion are affixed onto the base by twisting the corner pillars of the bottom portion onto second threaded stepped dowels protruding out of the base.

13. The method of claim 12, wherein the forming the bottom portion comprises affixing the first middle pillar, the second middle pillar, the third middle pillar, and the fourth middle pillar of the bottom portion onto the base after the first corner pillar, the second corner pillar, the third corner pillar, and the fourth corner pillar of the bottom portion have been twisted into place, thereby locking in place all the pillars of the bottom portion.

14. The method of claim 11, wherein each of the center pillar, the plurality of corner pillars, and the plurality of middle pillars of each of the bottom portion, middle portion, and top portion are made of a wooden material.

15. The method of claim 11, wherein the center pillar, the plurality of corner pillars, and the plurality of middle pillars of each of the bottom portion, middle portion, and top portion together form a three-by-three grid of pillars.

16. The method of claim 11, wherein the plurality of first threaded stepped dowels are made of a wooden material.

* * * * *